US010971877B2

(12) United States Patent
Zhu

(10) Patent No.: US 10,971,877 B2
(45) Date of Patent: Apr. 6, 2021

(54) BUSBARS DOCKING PLATFORM

(71) Applicant: Gong Zhu, Shenzhen (CN)

(72) Inventor: Gong Zhu, Shenzhen (CN)

( * ) Notice: Subject to any disclaimer, the term of this patent is extended or adjusted under 35 U.S.C. 154(b) by 0 days.

(21) Appl. No.: 16/819,047

(22) Filed: Mar. 14, 2020

(65) Prior Publication Data
US 2021/0050699 A1    Feb. 18, 2021

(30) Foreign Application Priority Data

Aug. 16, 2019   (CN) .......................... 201910760403.9

(51) Int. Cl.
| | |
|---|---|
| *B23P 19/00* | (2006.01) |
| *H01R 43/20* | (2006.01) |
| *H01R 43/00* | (2006.01) |
| *H01R 4/50* | (2006.01) |

(52) U.S. Cl.
CPC ........... *H01R 43/00* (2013.01); *H01R 4/5033* (2013.01); *Y10T 29/53209* (2015.01)

(58) Field of Classification Search
CPC ...... H01R 43/00; H01R 43/26; H01R 4/5033; H01R 25/14; H02G 5/007; Y10T 29/49174; Y10T 29/53204; Y10T 29/53209; Y10T 29/53217

USPC .................... 29/857, 745, 747, 749
See application file for complete search history.

(56) References Cited

U.S. PATENT DOCUMENTS

| | | | |
|---|---|---|---|
| 3,180,924 A * | 4/1965 | Rowe ..................... | H02G 5/007 174/88 B |
| 8,540,526 B2 * | 9/2013 | Mooney ................. | H02G 5/007 439/213 |
| 9,147,948 B2 * | 9/2015 | Wildstone .............. | H01R 25/14 |
| 10,396,536 B2 * | 8/2019 | Zhu ........................ | H01R 43/26 |

FOREIGN PATENT DOCUMENTS

CN            105720538 A       6/2016

* cited by examiner

*Primary Examiner* — Donghai D Nguyen

(57) ABSTRACT

A platform for connecting busbars has a loading unit having a blind hole on a docking surface for receiving a connecting rod, an action unit used for impacting the loading unit or a busbar to push the connecting rod into a pre-hole on the busbar, a limit unit used for stopping the busbar from moving along its length direction, and a support unit used for supporting the action unit and the limit unit. The connecting rod is assembled to the first busbar by the action unit combined the loading unit and then the connecting rod already assembled to the first busbar is assembled to the second busar by the action unit.

6 Claims, 12 Drawing Sheets

BUSBARS DOCKING PLATFORM

CROSS-REFERENCE TO RELATED APPLICATIONS

This application claims priority benefit of Chinese Patent Application No. 201910760403.9 filed on 16 Aug. 2019. The above-referenced application is hereby incorporated herein by reference in its entirety.

BACKGROUND OF THE INVENTION

The invention relates to an electric device, especially to a platform used for connecting busbars.

In the field of power distribution, partly overlapping two busbars is usually used to be a connection manner between two busbars, then bolts and nuts are used to fasten them. As required by this connection manner, there is a certain length of two busbars needed to overlap for keeping a current density of a touching surface within a normal range of values so as to make the connecting part comply requirement of related standard. In order to keep a low temperature rising of an electric device, usually a length of overlapping is increased for increasing a touching surface so as to reduce a current density thereof. However, increasing the length of overlapping may increase busbars consumption resulted in increasing cost. Electric clearance or phase distance between busbars may be reduced as a result of bolts used for fastening, in order not to reduce the electric clearance or phase distance, a distance between busbars needs to be increased, however increasing the distance necessarily enlarge an occupation space of busbars. How to increase a touching surface for reducing a temperature rising not resulted in reducing electric clearance or phase distance or enlarging occupation space of busbars, there is a new manner of connecting busbars to solve the above problem, busbars are connected in a form of butt-and-butt connecting via connecting rods, see FIG. 18.

BRIEF SUMMARY OF THE INVENTION

The present invention aims to provide a docking platform for assembling connecting rods into busbars so as to dock two busbars together.

Such object is achieved by providing a busbars docking platform as defined in claim 1. Further advantageous according to the invention will be apparent from dependent claims.

The invention provides a busbars docking platform, the platform comprises a loading unit, an action unit, a limit unit and a support unit, the loading unit has a blind hole on a docking surface for receiving a connecting rod, the blind hole has a clearance fit with the connecting rod, the action unit is used for impacting the loading unit or a busbar to push the connecting rod into a pre-hole on the busbar, the limit unit is used for stopping the busbar from moving along its length direction. The support unit comprises a first shaft, a second shaft parallel to the first shaft, a receiving unit slidably connecting with the first shaft and the second shaft, a trestle used for supporting the first shaft and the second shaft, a pedestal used for supporting the trestle, wherein the receiving unit comprises a receiving block cooperating with the busbar, a receiving groove penetrating through the receiving block to receive the busbar along its width direction, a limit shaft movably inserting into the receiving block for going in and out of the receiving groove to stop the busbar from moving along its width direction. The receiving groove is arranged axially with the first shaft and between the first shaft and the second shaft, the limit unit comprises a first threaded rod parallel to the first shaft, a second threaded rod parallel to the first shaft, a limit block removably connecting with the first threaded rod and the second threaded rod, a connecting block connecting with the first threaded rod and the second threaded rod and cooperating with the action unit. The action unit comprises a first base fixedly connecting between the first shaft and the second shaft, a second base fitting with the connecting block of the limit unit, an end portion outwardly extending from the first base to impact the busbar, a driving mechanism housed in the first base and the second base to drive the end portion.

The invention further provides an operation method for operating busbars docking platform for assembling connecting rods into busbars to dock two busbars together, the operation method comprises following steps.

S1 Trigger a first release member to keep an end portion of an action unit at an exsertion state.

S2 Put a first busbar in a receiving groove of a second receiving unit and of a third receiving unit, insert a limit shaft into the second receiving unit and insert a limit shaft into the third receiving unit, arrange the limit shaft to insert into the receiving groove.

S3 Put a loading unit in the receiving groove of a first receiving unit.

S4 Arrange a docking surface of the first busbar to touch a docking surface of the loading unit, arrange a surface of the loading unit away from the docking surface to touch an end portion of the action unit, adjust and fasten a limit block of a limit unit to arrange the limit block to touch a surface away from the docking surface of the first busbar.

S5 Remove the loading unit.

S6 Load a connecting rod to the loading unit.

S7 Operate a second release member to retract the end portion of the action unit and to keep the end portion at a retraction state.

S8 Turn a handle to compress a spring of a driving mechanism and to keep the spring at a first compression state.

S9 Put the loading unit loaded with the connecting rod in the receiving groove of the first receiving unit, arrange the surface away from the docking surface of the loading unit against the end portion of the action unit, insert the limit shaft into the first receiving unit to insert the limit shaft into the receiving groove.

S10 Trigger the first release member to exsert the end portion of the action unit to impact the loading unit so that the connecting rod on the loading unit inserts into a pre-hole of the first busbar.

S11 Trigger the second release member to retract the end portion of the action unit.

S12 Draw the limit shaft out of the receiving unit to take the first busbar and the loading unit out from the receiving groove of the receiving unit, remove the loading unit to finish assembling the connecting rod into the first busbar.

S13 Trigger the first release member after the spring of the driving mechanism is compressed and kept at the first compression state by turning the handle.

S14 Put a second busbar in the receiving groove of the third receiving unit and in the receiving groove of a fourth receiving unit, insert the limit shaft into the third receiving unit and of the fourth receiving unit to insert the limit shaft into the receiving groove.

S15 Put the first busbar already assembled with the connecting rod between the end portion of the action unit and the second busbar to arrange that the docking surface of the first busbar touches the docking surface of the second busbar and that the surface away from the docking surface of the first busbar touches the end portion of the action unit, adjust and fasten the limit block of the limit unit to arrange the limit block to touch a surface away from the docking surface of the second busbar.

S16 Remove the first busbar already assembled with the connecting rod.

S17 Trigger the second release member to retract the end portion of the action unit and to keep the end portion at the retraction state.

S18 Turn the handle to compress the spring of the driving mechanism and to keep the spring at the first compression state.

S19 Put the first busbar already assembled with the connecting rod in the receiving groove of the first receiving unit and the receiving groove of the second receiving unit to arrange the surface away from the docking surface of the first busbar against the end portion of the action unit, insert the limit shaft into the first receiving unit and into the second receiving unit.

S20 Trigger the first release member to exsert the end portion of the action unit to impact the first busbar so that the connecting rod on the first busbar inserts into a pre-hole of the second busbar.

S21 Trigger the second release member to retract the end portion of the action unit.

S22 Draw the limit shaft out of the receiving unit to take the first busbar and the second busbar out from the receiving groove of the receiving unit, the connecting rod is assembled in the first busbar and the second busbar to finish docking the first busbar and the second busbar.

The invention further provides a busbars docking method for assembling connecting rods into busbars to dock two busbars together, the method comprises arranging a deep-freezing process for a plurality of connecting rods after been loaded in a loading unit, arranging a heat process for a docking surface of a first busbar, a plurality of connecting rods been axially inserted into corresponding pre-holes on a docking surface of the first busbar by a way that an action unit impacts the loading unit, arranging a deep-freezing process for the connecting rod after been assembled in the first busbar and arranging a heat process for the docking surface of the second busbar, pre-holes on a docking surface of a second busbar been axially sheathed on the corresponding connecting rods assembled to the docking surface of the first busbar by a way that the action unit impacts the second busbar.

Advantageous Effects (1) The busbars docking platform and operation method thereof disclosed by the application achieve that a plurality of connecting rods are assembled simultaneously into a busbar in stages and then two busbars are docked together well.

(2) The blind hole arranged to the loading unit has a clearance fit with the connecting rod, such arrangement is convenient for the loading unit to remove for next assembly process after that the connecting rods are assembled into the busbar and increases reusability of the loading unit.

(3) Because the loading unit has an identical outline to the busbar, the loading unit is also applicable for the receiving unit used for receiving the busbar, such arrangement increases interoperability of the loading unit.

(4) A deep-freezing process for connecting rods and a heat process for pre-holes of a busbar change assembly relation between the connecting rod and the pro-hole of the busbar from interference fit to clearance fit, so it is only need to impact the connecting rod quickly into the pre-hole when the connecting rod is assembled, it is no necessary for an end portion of an action unit to have much thrust force.

(5) Arrangement that a plurality of connecting rods can be loaded simultaneously to the loading unit increases docking efficiency for busbars.

(6) Clearance fit between the connecting rod and the pre-hole of the busbar after heat and freezing process combined with chamfer on an end surface of a connecting rod also can reach successful assembly between the connecting rod and the pre-hole under high speed impact of the action unit even if coaxiality between the connecting rod and the pre-hole is not very good.

(7) Because the end portion of the action unit impacts the loading unit other than the connecting rod, hypothermia of the connecting rod can not be effected by impact from the action unit, the connecting rod still keeps at shrinkage state so as to inserts easily into the pre-hole of the busbar.

(8) Because a limit block of a limit unit well touches an end of the busbar and a connecting block of the limit unit well touches a second base of the action unit, the busbar can not move along the direction of movement of the connecting rod when the connecting rod inserts into the busbar, such arrangement achieves a successful assembly of the connecting rod.

(9) Because a support unit comprises a first shaft and a second shaft parallel to the first shaft and because a receiving unit slidably connects with the first shaft and the second shaft, the receiving unit moves smoothly and can receive busbar of different length by cooperation with a plurality of receiving units.

(10) Because a receiving groove receives the busbar along width direction of the busbar, it is unhindered to put the busbar into the receiving groove over the docking platform.

(11) Because a limit shaft arranged to the receiving unit stops the busbar from moving along width direction during impact process, the connecting rod is assembled successfully.

(12) Because the limit shaft movably inserts into a receiving block, it is convenient for the receiving groove to change from openness to closure according to operation needs, openness is convenient to put the busbar, and closure is used to stop the busbar from moving along its width direction.

(13) The limit block is clamped at different position on a threaded rod by adjusting nuts at different position on the threaded rod to limit busbars of different length, such arrangement increases usability of the busbars docking platform for busbars of different length.

BRIEF DESCRIPTION OF THE SEVERAL VIEWS OF THE DRAWINGS

Further characteristics and advantages of the invention will emerge from the description of preferred, but not exclusive embodiments of a busbars docking platform according to the invention, non-limiting examples of which are provided in the attached drawings, in which.

Figure 1:
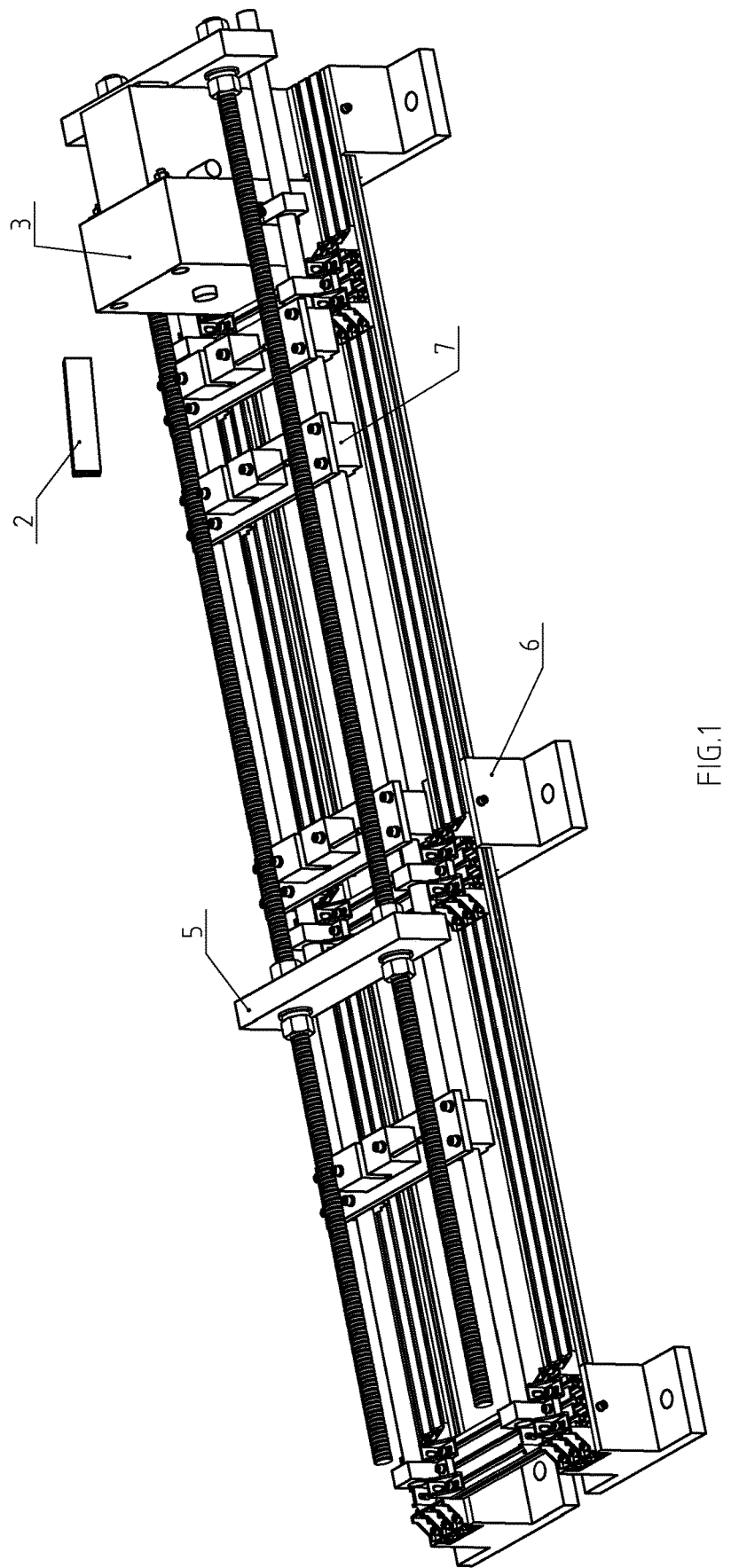
FIG. 1 is a 3d-drawing of a busbars docking platform of the embodiment of the present invention.

List of Reference Characters 1. connecting rod; 101. first busbar; 102. second busbar;
2. loading unit; 201. blind hole; 3. action unit;
301. first base; 302. second base; 303. end portion;
304. handle; 305. first button; 306. second button;
5. limit unit; 501. first threaded rod; 502. second threaded rod;
503. limit block; 504. connecting block; 6. support unit;
601. first shaft; 602. second shaft; 7. receiving unit;
701. receiving block; 702. receiving groove; 703. limit shaft;
704. first receiving unit; 705. second receiving unit; 706. third receiving unit;
707. fourth receiving unit.

DETAILED DESCRIPTION OF THE INVENTION

It is need to preprocess busbars before docking process, a pre-hole is arranged to a docking surface which is for connecting so as to receive a connecting rod, a depth of the pre-hole is slightly greater than half of a connecting rod. A length direction of the busbar is an axial direction of the busbar, a width direction of the busbar is a direction which has a greater dimension in busbar cross section, a thickness direction is a direction which has a less dimension in busbar cross section.

FIG. 1 is a 3d-drawing of a busbars docking platform of the invention, the platform comprises a loading unit 2, an action unit 3, a limit unit 5, a support unit 6, wherein the loading unit 2 has a blind hole 201 on a docking surface for receiving a connecting rod 1, the blind hole 201 has a clearance fit with the connecting rod 1. The action unit 3 is used for impacting the loading unit 2 or a busbar to push the connecting rod 1 into the pre-hole on the busbar. The limit unit 5 is used for stopping the busbar from moving along its length direction.

Figure 2:
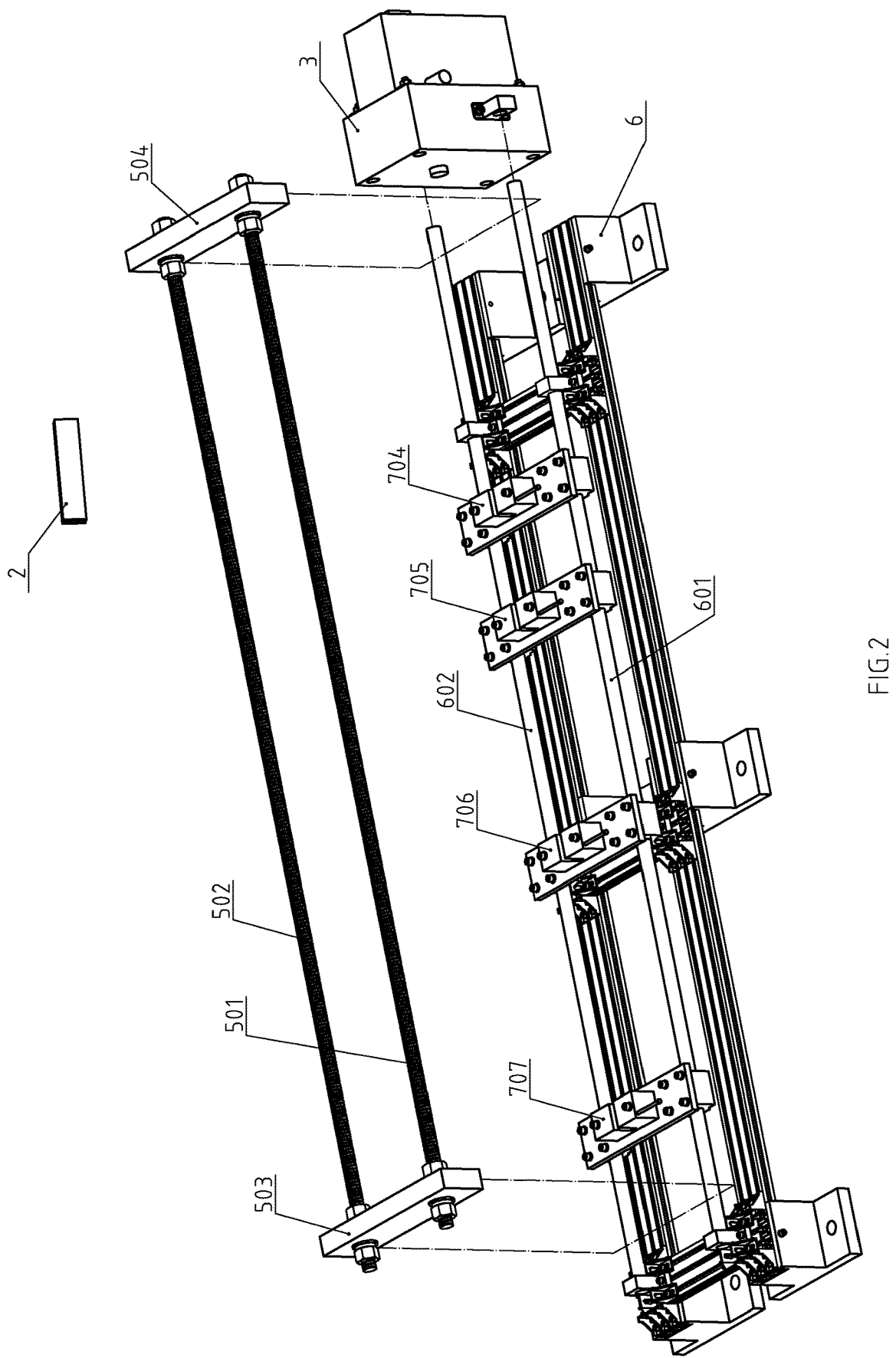
FIG. 2 is an exploded 3d-drawing of FIG. 1.

Referring to FIG. 2, the support unit 6 comprises a first shaft 601, a second shaft 602 parallel to the first shaft 601, a receiving unit 7 slidably connecting with the first shaft 601 and the second shaft 602, a trestle used for supporting the first shaft 601 and the second shaft 602, a pedestal used for supporting the trestle. There are four receiving units 7 in this embodiment, they are a first receiving unit 704, a second second receiving unit 705, a third receiving unit 706 and a fourth receiving unit 707. Because the support unit 6 comprises the first shaft 601 and the second shaft 602 parallel to the first shaft 601 and because the receiving unit 7 slidably connects with the first shaft 601 and the second shaft 602, the receiving unit 7 moves smoothly and can receive a busbar of different length by cooperation with a plurality of receiving units 7.

Figure 11:
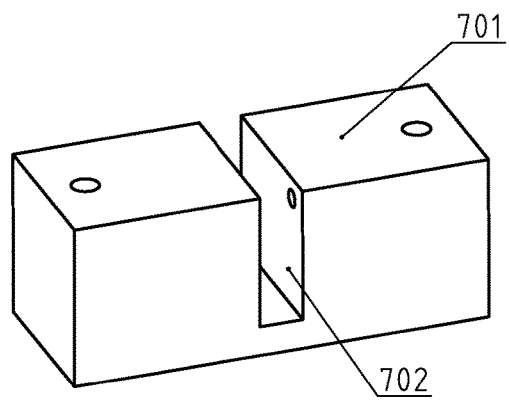
FIG. 11 is a 3d-drawing of a receiving unit disclosed in the embodiment.
Figure 12:
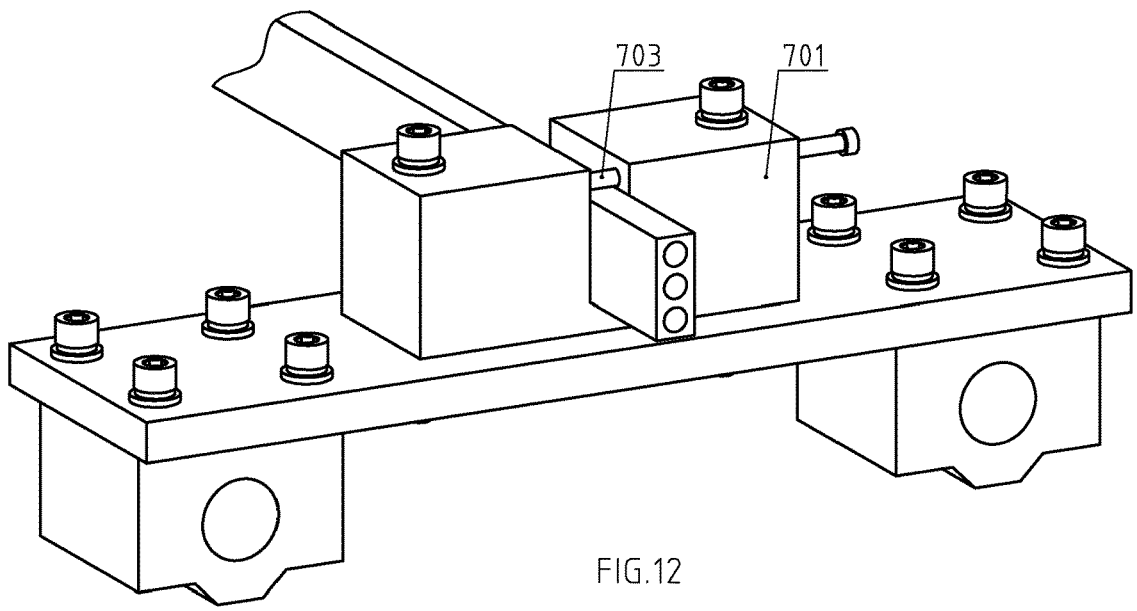
FIG. 12 is a 3d-drawing of a receiving unit assembled with a busbar disclosed in the embodiment.
Figure 13:
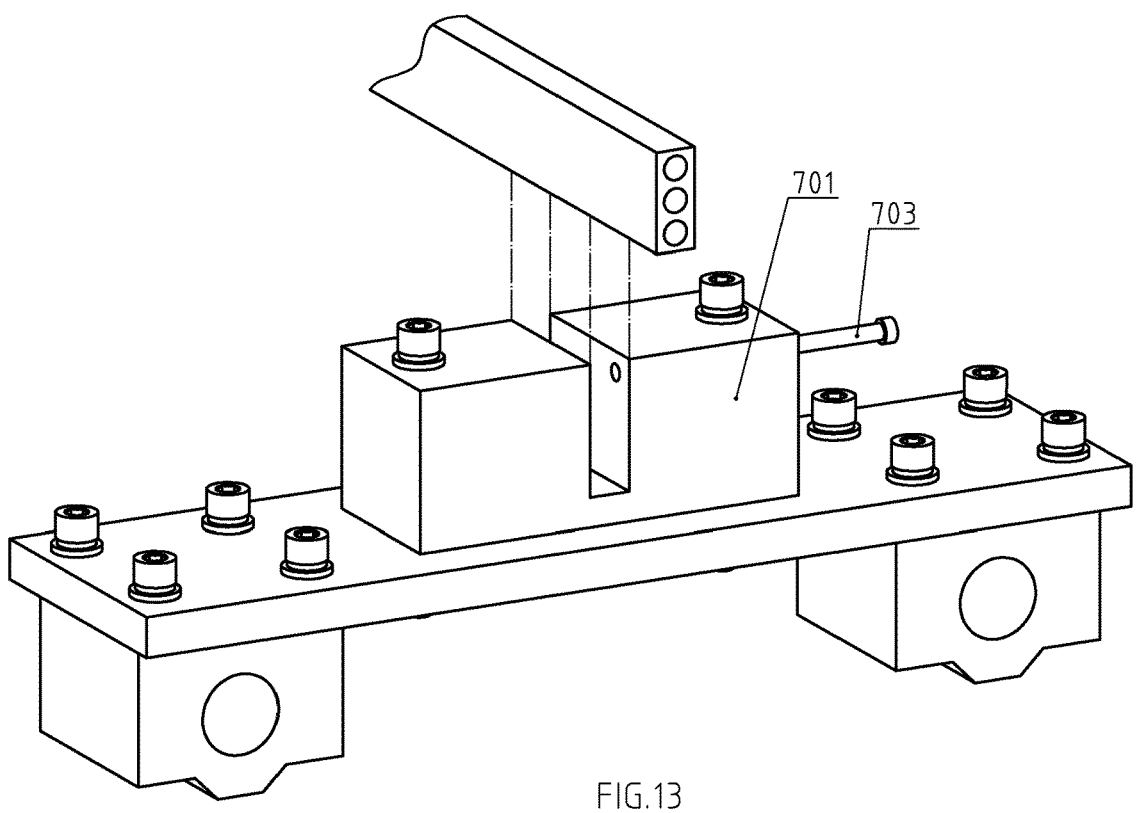
FIG. 13 is a 3d-drawing of a receiving unit removing a busbar disclosed in the embodiment.

Referring to FIG. 12 and FIG. 13, the receiving unit 7 comprises a mounting plate, the receiving block 701 removably connected to the mounting plate, two sliding blocks removably connected to the mounting plate. The receiving block 701 is arranged at a center position of a length direction of the mounting plate, the two sliding blocks are mirror images to each other concerning a center surface of the length direction of the mounting plate, the sliding block and the receiving block 701 are arranged to opposing side of the mounting plate. Wherein the receiving block 701 is used for receiving the busbar, the receiving block 701 comprises a receiving groove 702 and a limit shaft 703, the receiving groove 702 penetrates through the receiving block 701 to receive the busbar along its width direction, see FIG. 11. The receiving groove 702 is arranged axially with the first shaft 601 and between the first shaft 601 and the second shaft 602, the limit shaft 703 movably inserts into the receiving block 701 for going in and out of the receiving groove 702 to stop the busbar from moving along its width direction. Because the receiving groove receives the busbar along width direction of the busbar, it is unhindered for an operator to put the busbar into the receiving groove over the docking platform, such arrangement increases assembly efficiency. The limit shaft 703 arranged to the receiving unit stops the busbar from moving along width direction during impact process, such arrangement is good for the connecting rod to assemble successfully.

Referring to FIG. 2, the limit unit 5 comprises a first threaded rod 501 and a second threaded rod 502 both parallel to the first shaft 601, a limit block 503 removably connecting with the first threaded rod 501 and the second threaded rod 502, a connecting block 504 connecting with the first threaded rod 501 and the second threaded rod 502 and cooperating with the action unit 3.

Figure 8:
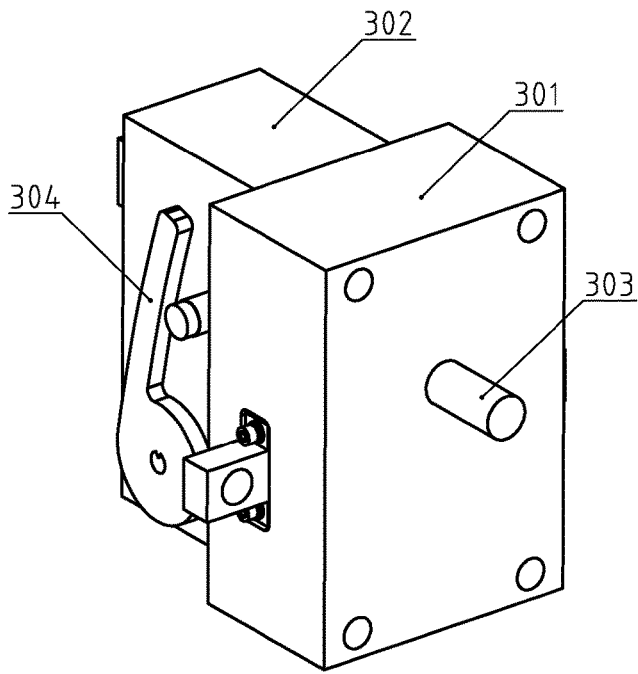
FIG. 8 is a 3d-drawing of an action unit, wherein an end portion is at an exsertion state.

Referring to FIG. 8, the action unit 3 comprises a first base 301 fixedly connecting between the first shaft 601 and the second shaft 602, a second base 302 fitting with the connecting block 504 of the limit unit 5, an end portion 303 outwardly extending from the first base 301 to impact the busbar, and a driving mechanism housed in the first base 301 and the second base 302 to drive the end portion 303. Because the limit block 503 of the limit unit 5 well touches an end of the busbar and the connecting block 504 of the limit unit 5 well touches the second base 302 of the action unit 3, the busbar can not move along the direction of movement of the connecting rod 1 when the connecting rod 1 inserts into the busbar, such arrangement achieves a successful assembly of the connecting rod. The driving mechanism comprises a spring, an operation member used for compress the spring to store energy, a first member used for keeping the spring at a first compression state, a second member used for keeping the spring at a second compression state, a third member used for keeping the spring at a third compression state, a first release member used for releasing the spring to move from the first compression state to the second compression state, and a second release member used for releasing the spring to move from the second compression state to the third compression state. The end portion 303 of the action unit 3 is at a retraction state when the spring is at the first compression state or at the third compression state, see FIG. 9. The end portion 303 of the action unit 3 is at an exsertion state when the spring is at the second compression state, see FIG. 8. The operation member connects a handle arranged out of the first base 301 and out of the second base 302, the spring is compressed by the operation member when the handle is turned.

Figure 9:
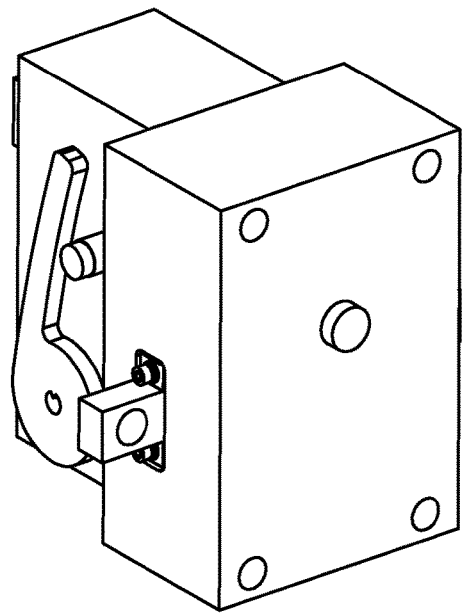
FIG. 9 is a 3d-drawing of an action unit, wherein an end portion is at an retraction state.
Figure 10:
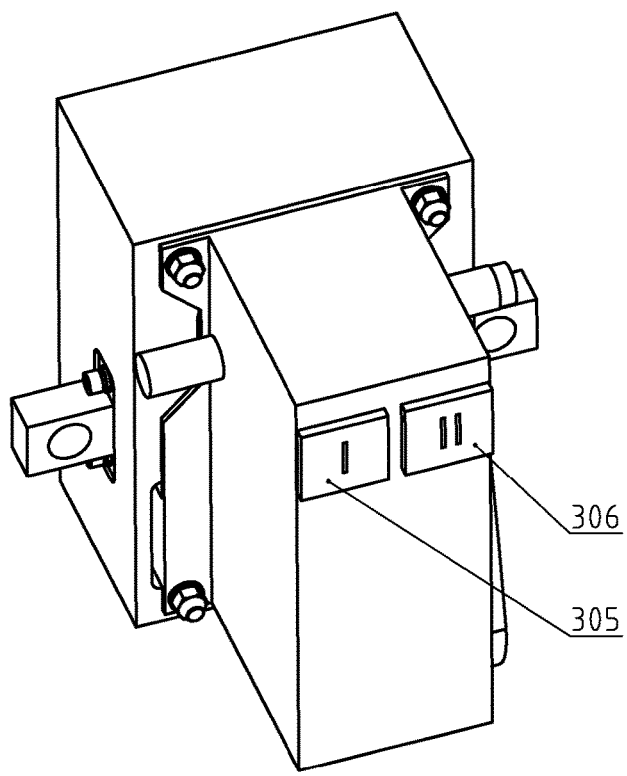
FIG. 10 is a 3d-drawing of FIG. 8 from another view.

Referring to FIG. 9, the action unit 3 further comprises a first button 305 and a second button 306, to trigger the first button 305 is to make the first release member act, the spring moves from the first compression state to the second compression state. To trigger the second button 306 is to make the second release member act, the spring moves from the second compression state to the third compression state.

Figure 15:
FIG. 15 is an exploded 3d-drawing of FIG. 14.
Figure 16:
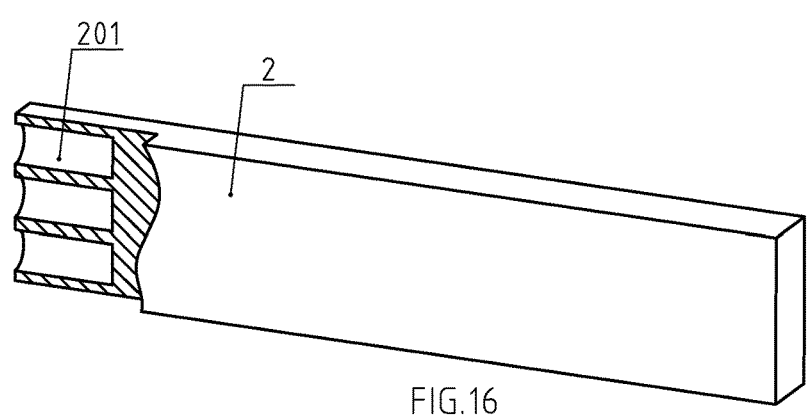
FIG. 16 is a sectional 3d-drawing of the loading unit disclosed in the embodiment.

Referring to FIG. 15, the loading unit 2 has an identical outline to a first busbar 101 or a second busbar 102, the blind hole 201 is arranged on a docking surface of the loading unit 2 and extends along a length direction of the loading unit 2, an effective depth of the blind hole 201 is half of axial length of the connecting rod 1, see FIG. 16. The blind hole arranged to the loading unit has a clearance fit with the connecting rod 1, such arrangement is convenient for the loading unit 2 to remove for next assembly process after that the connecting rods 1 are assembled into the busbar and increases reusability of the loading unit 2. Because the loading unit 2 has an identical outline to the busbar, the loading unit 2 is also applicable for the receiving unit 2 used for receiving the busbar, such arrangement increases interoperability of the loading unit 2.

Figure 3:
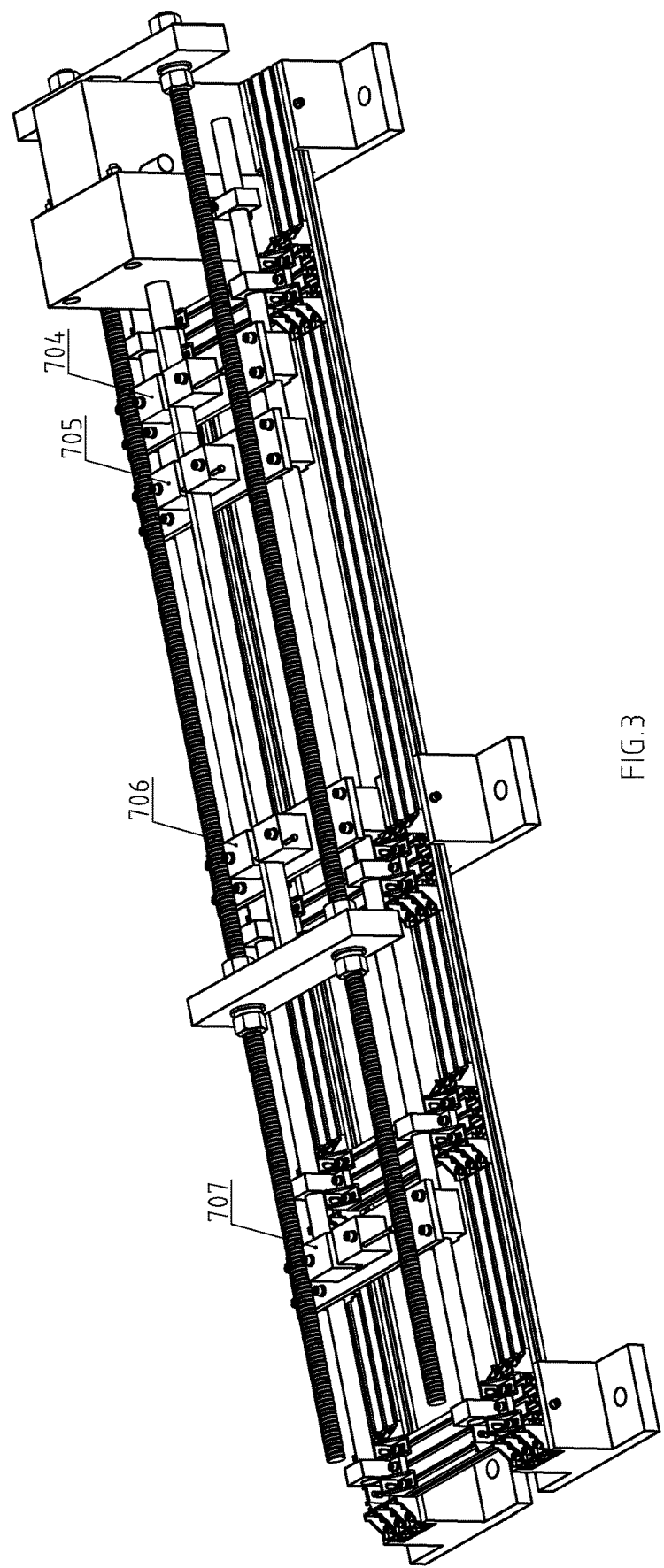
FIG. 3 is a 3d-drawing of the platform showing a position of a limit block during assembling a first busbar.
Figure 4:
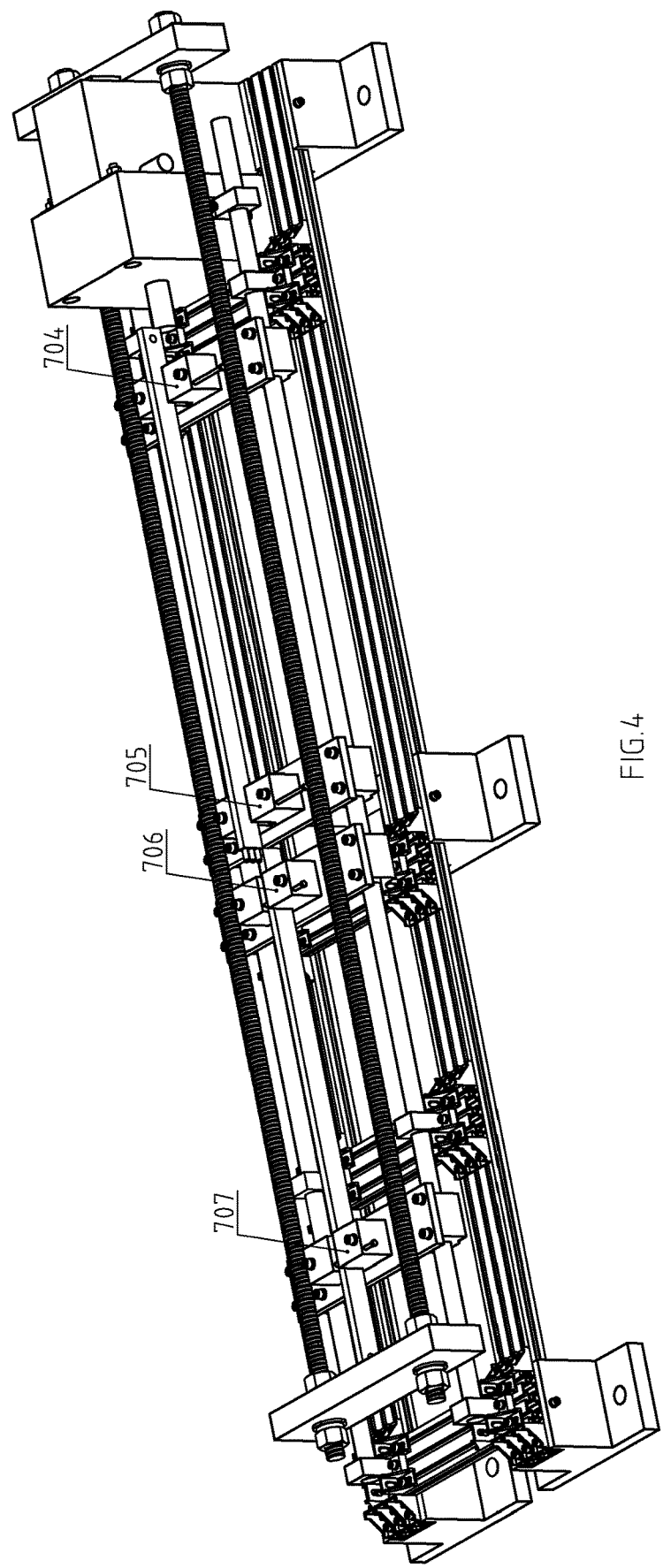
FIG. 4 is a 3d-drawing of the platform showing a position of a limit block during assembling a second busbar.

Referring to FIG. 3, the busbars docking platform has four receiving units 7, they are a first receiving unit 701, a second receiving unit 702, a third receiving unit 703 and a fourth receiving unit 704. The first receiving unit 701 is used for receiving the loading unit 2 and both the second receiving unit 702 and the third receiving unit 703 are used for receiving the first busbar 101 at a stage of assembling the first busbar 101. Both the first receiving unit 701 and the second receiving unit 702 are used for receiving the first busbar 101 and both the third receiving unit 703 and the fourth receiving unit 704 are used for receiving the second busbar 102 at a stage of assembling the second busbar, see FIG. 4.

Referring to FIG. 2, the first threaded rod 501 is removably connected by two first nuts clamping the limit block 503, the second threaded rod 502 is removably connected by two second nuts clamping the limit block 503, the first threaded rod 501 is connected by two third nuts clamping the connecting block 504, the second threaded rod 502 is connected by two fourth nuts clamping the connecting block 504. The limit block 503 is clamped at different positions on the threaded rod by adjusting nuts at different positions on the threaded rod to limit busbars of different length, such arrangement increases usability of the busbars docking platform for busbars of different length.

The embodiment of the invention also discloses an operation method of the busbars docking platform, the operation method comprises following steps.

S1 Trigger the first button 305 of the action unit 3 to make the first release member act and to keep the end portion 303 of the action unit 3 at the exsertion state, check positions of the limit shafts 703 arranged to the first receiving unit 704, the second receiving unit 705, the third receiving unit 706 and the fourth receiving unit 707, draw each limit shaft 703 out of the corresponding receiving unit 7 to vacate the receiving groove 702 if the limit shaft 703 inserts into the receiving groove 702.

Figure 19:
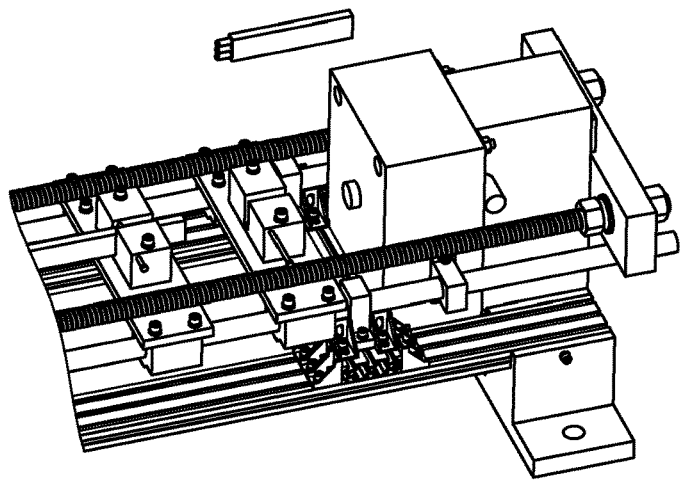
FIG. 19 is a sectional 3d-drawing of the platform showing an assembly process for the first busbar.
Figure 20:
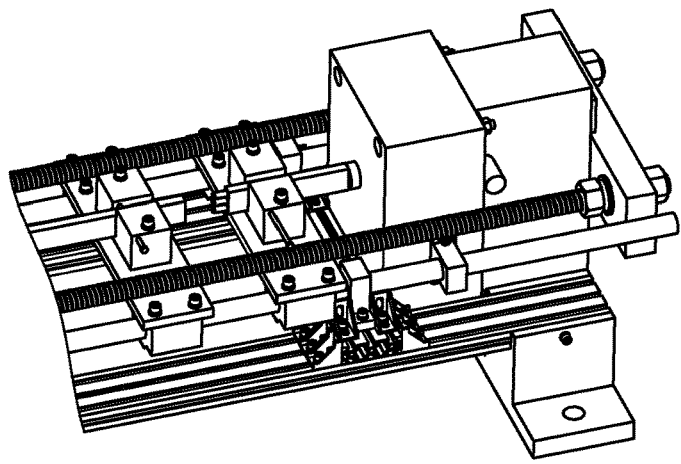

S2 Put the first busbar 101 in the receiving groove 702 of the second receiving unit 705 and in the receiving groove 702 of the third receiving unit 706 in a way that the docking surface of the busbar faces the action unit 3, insert the limit shaft 703 into the second receiving unit 705 and insert the limit shaft 703 into the third receiving unit 706, arrange the limit shaft 703 to insert into the receiving groove 702, see FIG. 19.

S3 Put the loading unit 2 in the receiving groove 702 of the first receiving unit 704, the loading unit 2 is only used for determining a position of the limit block 503 of the limit unit 5 at present, so it is no need for the loading unit 2 to receive the connecting rod 1.

S4 Arrange a docking surface of the first busbar 101 to touch a docking surface of the loading unit 2, arrange a surface of the loading unit 2 away from the docking surface to touch the end portion 303 of the action unit 3, adjust and fasten the limit block 503 of the limit unit 5 to arrange the limit block 503 to touch a surface away from the docking surface of the first busbar 101, see FIG. 3.

S5 Remove the loading unit 2 from the busbars docking platform.

Figure 14:
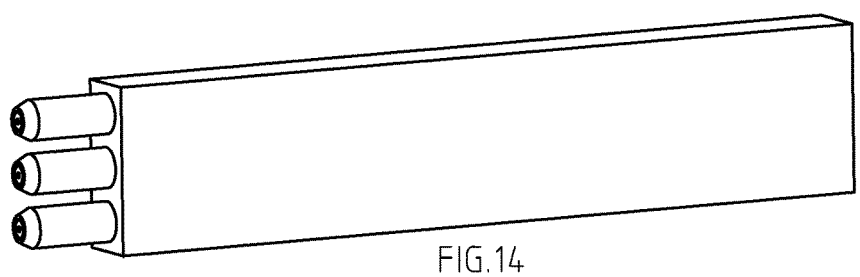
FIG. 14 is a 3d-drawing of a loading unit assembled with a connecting rod in the embodiment.

S6 Load the connecting rod 1 to the loading unit 2, see FIG. 14, put the loading unit 2 already loaded with the connecting rod 1 in liquid-nitrogen for deep-freezing in such a way that the connecting rod 1 is completely covered by the liquid-nitrogen for 5 minutes.

S7 Trigger the second button 306 of the action unit 3 to make the second release member act so as to retract the end portion 303 of the action unit 3 and to keep the end portion 303 at a retraction state.

S8 Turn the handle 304 of the action unit 3 to compress the spring of the driving mechanism and to keep the spring at a first compression state, heat the docking surface of the first busbar 101 to reach a temperature of over 200 celsius degrees.

Figure 21:
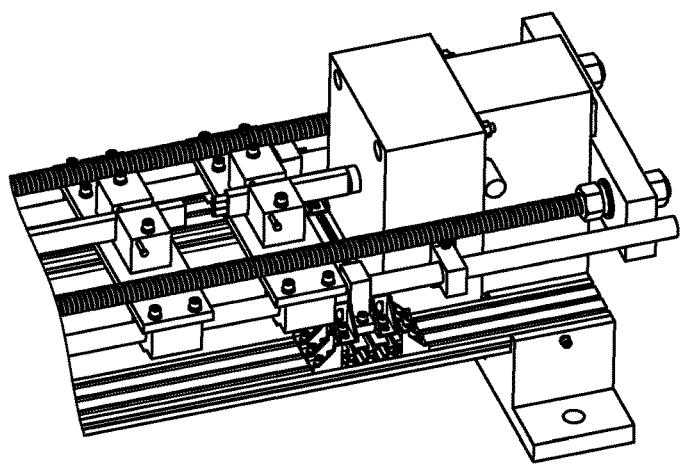

S9 Take the loading unit 2 loaded with the connecting rod 1 out of liquid-nitrogen, put the loading unit 2 in the receiving groove 702 of the first receiving unit 704, arrange the surface away from the docking surface of the loading unit 2 against the end portion 303 of the action unit 3, insert the limit shaft 703 into the first receiving unit 704 to insert the limit shaft into the receiving groove 702, see FIG. 21.

Figure 17:
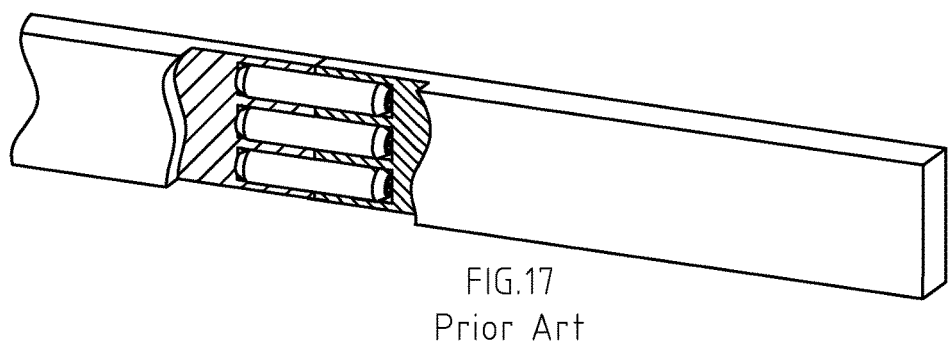
FIG. 17 is a sectional 3d-drawing of the loading unit, wherein the connecting rod is assembled to the first busbar by the loading unit.
Figure 18:
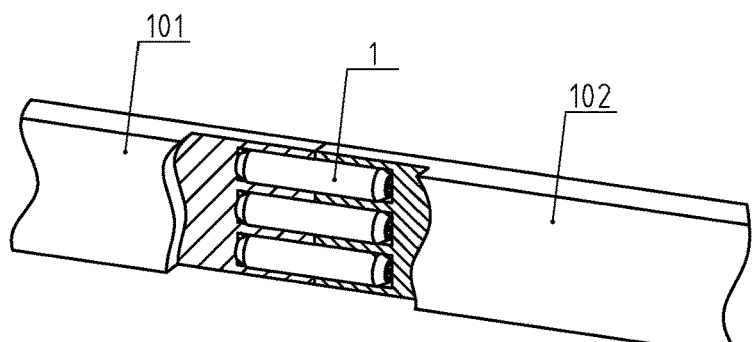
FIG. 18 is a sectional 3d-drawing of busbars docked together by connecting rods.
Figure 22:
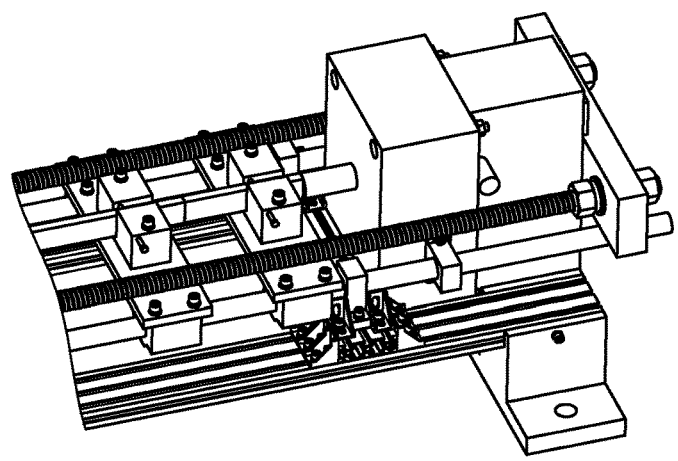

S10 Trigger the first button 305 of the action unit 3 to make the first release member act so as to exsert the end portion 303 of the action unit 3 to impact the loading unit 2 so that the connecting rod 1 on the loading unit 2 inserts into a pre-hole of the first busbar 101, see FIG. 22 and FIG. 17. Because a deep-freezing process for the connecting rod 1 and a heat process for the pre-hole of the busbar change assembly relation between the connecting rod 1 and the pro-hole of the busbar from interference fit to clearance fit, it is only need to impact the connecting rod quickly into the pre-hole when the connecting rod 1 is assembled, it is no necessary for the end portion 303 of an action unit 3 to have much thrust force. Clearance fit between the connecting rod 1 and the pre-hole of the busbar after heat and freezing process combined with chamfer on an end surface of the connecting rod 1 also can reach successful assembly between the connecting rod 1 and the pre-hole under high speed impact of the action unit 3 even if coaxiality between the connecting rod 1 and the pre-hole is not very good. Arrangement that a plurality of connecting rods 1 can be loaded simultaneously to the loading unit 3 increases docking efficiency for busbars. Because the end portion 303 of the action unit 3 impacts the loading unit 2 other than the connecting rod 1, hypothermia of the connecting rod 1 can not be effected by impact from the action unit 3, the connecting rod 1 still keeps at shrinkage state so as to inserts easily into the pre-hole of the busbar.

Figure 23:
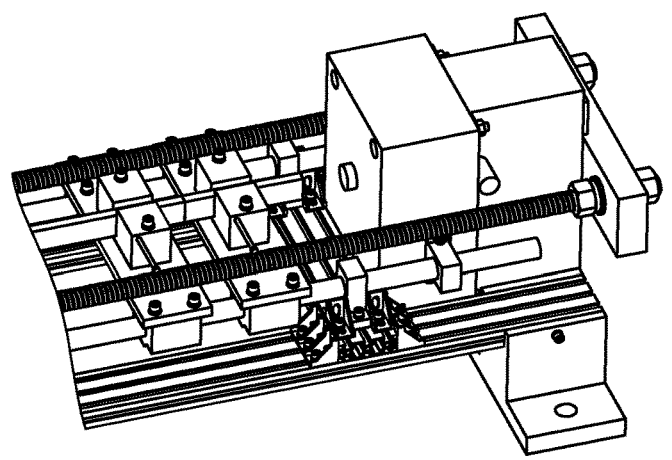

S11 Trigger the second button 306 to make the second release member act so as to retract the end portion 303 of the action unit 3, see FIG. 23.

Figure 24:
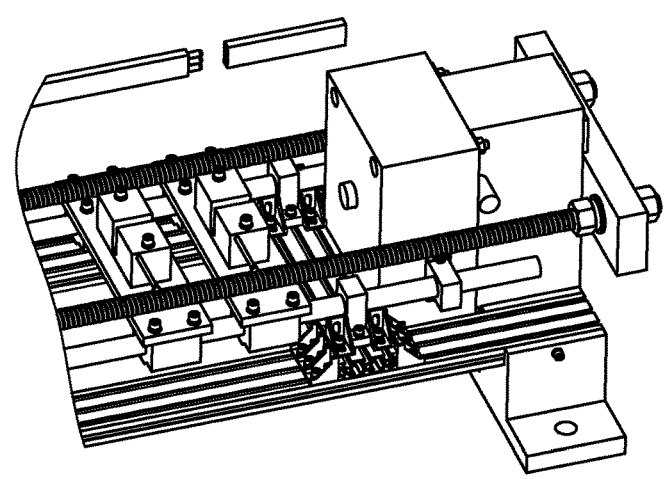

S12 Draw the limit shaft 703 out of the receiving unit 7 to take the first busbar 101 and the loading unit 2 out from the receiving groove 702 of the receiving unit 7, remove the loading unit 2 to finish assembling the connecting rod 1 into the first busbar 101, see FIG. 24. Because the limit shaft 703 movably inserts into the receiving block 701, it is convenient for the receiving groove 702 to change from openness to closure according to operation needs, openness is convenient to put the busbar, and closure is used to stop the busbar from moving along its width direction.

S13 Trigger the first button 305 to make the first release member act after the spring of the driving mechanism is compressed and kept at the first compression state by turning the handle.

S14 Put the second busbar 102 in the receiving groove 702 of the third and fourth receiving units 706,707 in a way that the docking surface of the second busbar 102 faces the action unit 3, insert he limit shaft 703 into the third receiving unit 706 and insert the limit shaft 703 into the fourth receiving unit 707 to insert the limit shaft 703 into the receiving groove 702.

S15 Put the first busbar 101 assembled with the connecting rod 1 between the end portion 303 of the action unit 3 and the second busbar 102 to arrange that the docking surface of the first busbar 101 touches the docking surface of the second busbar 102 and that the surface away from the docking surface of the first busbar 101 touches the end portion 303 of the action unit 3, adjust and fasten the limit block 503 of the limit unit 5 to arrange the limit block 503 to touch a surface away from the docking surface of the second busbar 102. The first busbar 101 is only used for determining a position of the limit block 503 of the limit unit 5 at present, so it is no need for the first busbar 101 already assembled with the connecting rod 1 to be housed completely in the receiving groove 702 of the receiving unit 7, see FIG. 4.

S16 Remove the first busbar 101 already assembled with the connecting rod 1 and then put the first busbar 101 assembled with the connecting rod 1 in liquid-nitrogen for deep-freezing in such a way that the connecting rod 1 is completely covered by the liquid-nitrogen for 5 minutes.

Figure 5:
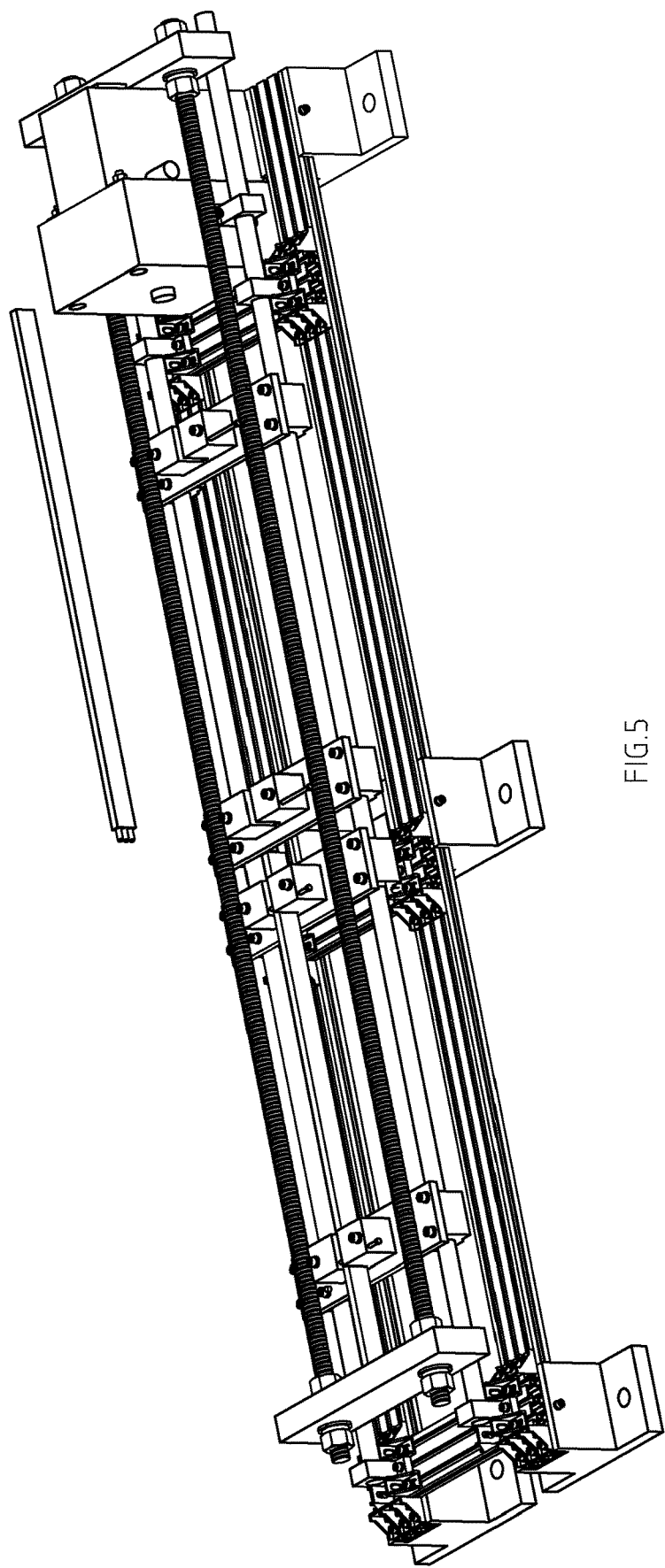
FIG. 5 is a 3d-drawing of the platform showing an assembly process for a second busbar.

S17 Trigger the second button 306 of the action unit 3 to make the second release member act so as to retract the end portion 303 of the action unit 3 and to keep the end portion 303 at the retraction state, see FIG. 5.

S18 Turn the handle 304 of the action unit 3 to compress the spring of the driving mechanism and to keep the spring at the first compression state, heat the docking surface of the second busbar 102 to reach a temperature of over 200 celsius degrees.

S19 Take the first busbar 101 already assembled with the connecting rod 1 out of liquid-nitrogen and then put the first busbar 101 already assembled with the connecting rod 1 in the receiving groove 702 of the first receiving unit 704 and in the receiving groove 702 of the second receiving unit 705 to arrange the surface away from the docking surface of the first busbar 101 against the end portion 303 of the action unit 3, insert the limit shaft 703 into the first receiving unit 704 and inset the limit shaft 703 into the second receiving unit 705.

Figure 6:
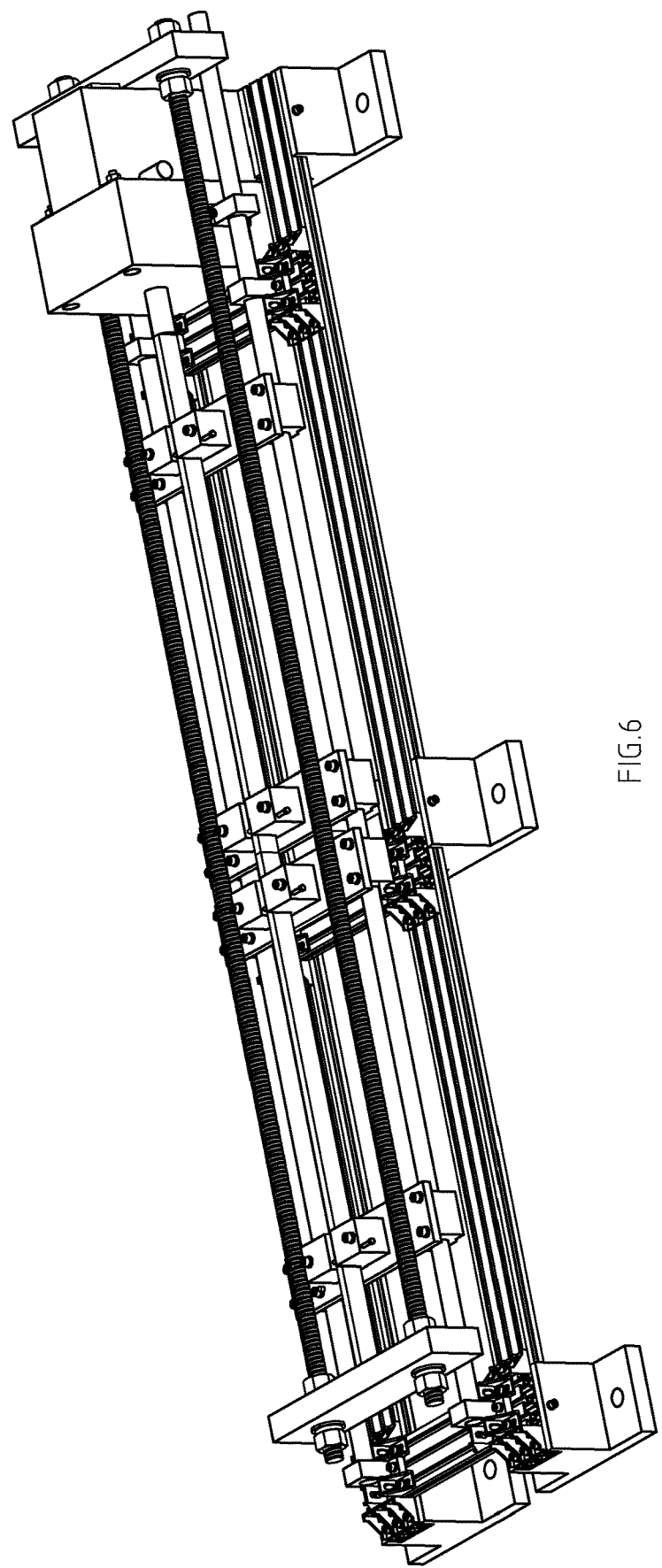
FIG. 6 is a 3d-drawing of the platform showing two busbars docking together.

S20 Trigger the first button 305 of the action unit 3 to make the first release member act so as to exsert the end portion 303 of the action unit 3 to impact the first busbar 101 so that the connecting rod 1 on the first busbar 101 inserts into a pre-hole of the second busbar 102, see FIG. 6

S21 Trigger the second button 306 of the action unit 3 to make the second release member act so as to retract the end portion 303 of the action unit 3.

Figure 7:
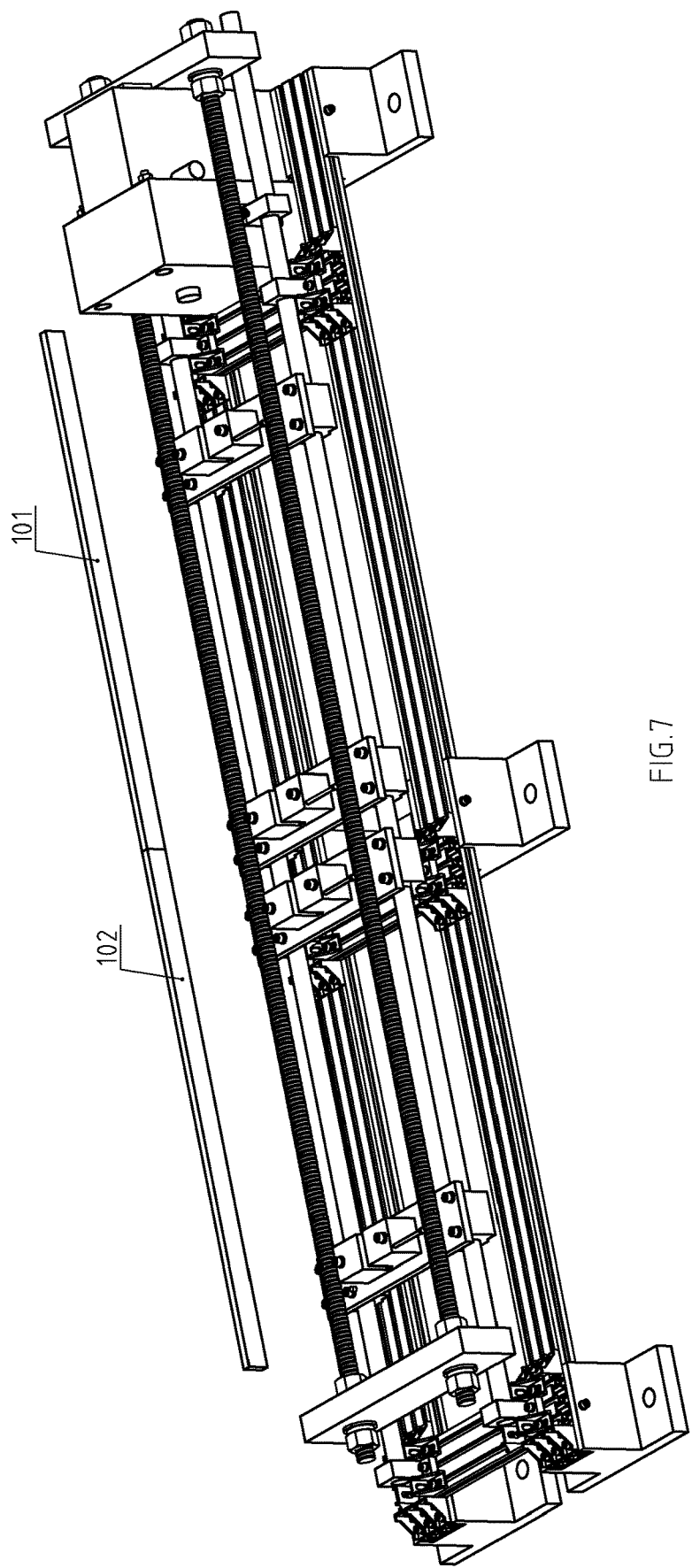
FIG. 7 is a 3d-drawing of the platform, wherein busbars are removed after finishing docking process.

S22 Draw the limit shaft 703 out of the receiving unit 7 to take the first busbar 101 and the second busbar 102 out from the receiving groove 702 of the receiving unit 7, the connecting rod 1 is assembled in the first busbar 101 and the second busbar 102 so that the first busbar 101 and the second busbar 102 are docked together well, see FIG. 7.

The operation method of busbars docking platform disclosed above achieves that a plurality of connecting rods are assembled simultaneously into a busbar in stages and then two busbars are docked together well, so the invention also discloses a busbars docking method, the method comprises arranging a deep-freezing process for a plurality of connecting rods 1 after been loaded in the loading unit 2, arranging a heat process for a docking surface of the first busbar101, arranging the action unit 3 to impact the loading unit 2 so that a plurality of connecting rods 1 are axially inserted into corresponding pre-holes on the docking surface of the first busbar, arranging a deep-freezing process for the connecting rod 1 after been assembled in the first busbar 101 and arranging a heat process for the docking surface of the second busbar 102, arranging the action unit 3 to impact the second busbar 102 so that pre-holes on the docking surface of the second busbar 102 are axially sheathed on the corresponding connecting rods 1 assembled to the docking surface of the first busbar 101.

The invention claimed is:

1. A busbars docking platform comprising:
a loading unit (2),
an action unit (3),
a limit unit (5), and
a support unit (6);
wherein the loading unit (2) having a blind hole (201) on a docking surface for receiving a connecting rod (1), the blind hole (201) having a clearance fit with the connecting rod (1), the action unit (3) being used for impacting the loading unit (2) or a busbar to push the connecting rod (1) into a pre-hole on the busbar, the limit unit (5) being used for stopping the busbar from moving along a length direction of the busbar;
wherein the support unit (6) comprising:
a first shaft (601),
a second shaft (602) parallel to the first shaft (601),
a receiving unit (7) slidably connecting with the first shaft (601) and the second shaft (602),
a trestle used for supporting the first shaft (601) and the second shaft (602), and
a pedestal used for supporting the trestle;
wherein the receiving unit (7) comprising:
a receiving block (701) cooperating with the busbar,
a receiving groove (702) penetrating through the receiving block (701) to receive the busbar along a width direction of the busbar, and a limit shaft (703) movably inserting into the receiving block (701) for going in and out of the receiving groove (702) to stop the busbar from moving along the width direction;

wherein the receiving groove (702) being arranged axially with the first shaft (601) and between the first shaft (601) and the second shaft (602), wherein the limit unit (5) comprising:
- a first threaded rod (501) and a second threaded rod (502) both parallel to the first shaft (601),
- a limit block (503) removably connecting with the first threaded rod (501) and the second threaded rod (502), and
- a connecting block (504) connecting with the first threaded rod (501) and the second threaded rod (502) and cooperating with the action unit (3);

wherein the action unit (3) comprising:
- a first base (301) fixedly connecting between the first shaft (601) and the second shaft (602),
- a second base (302) fitting with the connecting block (504) of the limit unit (5),
- an end portion (303) outwardly extending from the first base (301) to impact the busbar, and
- a driving mechanism housed in the first base (301) and the second base (302) to drive the end portion (303).

2. The busbars docking platform according to claim 1, wherein the driving mechanism comprises:
- a spring,
- an operation member used for compress the spring to store energy,
- a first member used for keeping the spring at a first compression state,
- a second member used for keeping the spring at a second compression state,
- a third member used for keeping the spring at a third compression state,
- a first release member used for releasing the spring to move from the first compression state to the second compression state, and
- a second release member used for releasing the spring to move from the second compression state to the third compression state;

wherein the end portion (303) of the action unit (3) being at a retraction state when the spring is at the first compression state or at the third compression state, the end portion (303) of the action unit (3) being at an exsertion state when the spring is at the second compression state.

3. The busbars docking platform according to claim 2, wherein the operation member connects to a handle arranged out of the first base (301) and out of the second base (302), the spring being compressed by the operation member when the handle is turned.

4. The busbars docking platform according to claim 1, wherein the loading unit (2) has an identical outline to a first busbar (101) or a second busbar (102), the blind hole (201) being arranged on a docking surface of the loading unit (2) and extending along a length direction of the loading unit (2), an effective depth of the blind hole (201) being half of axial length of the connecting rod (1).

5. The busbars docking platform according to claim 1, wherein the docking platform has four receiving units (7), a first receiving unit (704) being used for receiving the loading unit (2) and both a second receiving unit (705) and a third receiving unit (706) being used for receiving a first busbar at a stage of assembling the first busbar (101), the first receiving unit (704) and the second receiving unit (705) both being used for receiving the first busbar (101) and the third receiving unit (706) and a fourth receiving unit (707) both being used for receiving a second busbar (102) at a stage of assembling the second busbar.

6. The busbars docking platform according to claim 1, wherein the first threaded rod (501) is removably connected by two first nuts clamping the limit block (503), the second threaded rod (502) being removably connected by two second nuts clamping the limit block (503), the first threaded rod (501) being connected by two third nuts clamping the connecting block (504), the second threaded rod (502) being connected by two fourth nuts clamping the connecting block (504).

* * * * *